United States Patent

[11] 3,587,930

[72] Inventors George Schultz
Newton;
Michael Dziki, Dorchester, Mass.
[21] Appl. No. 847,817
[22] Filed July 29, 1969
[45] Patented June 28, 1971
[73] Assignee Industrial Shoe Machinery
Roxbury, Mass.
Continuation-in-part of application Ser. No.
712,224, Mar. 11, 1965, now abandoned.

[54] APPARATUS FOR DISPENSING THERMOPLASTIC MATERIAL
11 Claims, 6 Drawing Figs.
[52] U.S. Cl. .................................................. 222/146HE
[51] Int. Cl. ...................................................... B67d 5/62
[50] Field of Search.......................................... 222/146,
386, 146(HE)

[56] References Cited
UNITED STATES PATENTS
2,518,748  8/1950  Breer et al. ................. (222/146HE)
3,228,566  1/1966  Knox............. .............. 222/146
3,285,475  11/1966  Phillips......................... 222/146

Primary Examiner—Stanley H. Tollberg
Attorney—Joseph Zallen

ABSTRACT: Thermoplastic resins are fed to a desired location by an apparatus having a well with a heated inner section, provided with a discharge orifice, and an unheated outer section. A fitted, normally solid member of thermoplastic material is placed in the well whereupon only its bottom portion becomes molten. Continuous fluid pressure is applied on the exposed solid end of thermoplastic material and in conjunction with an externally controlled valve provides controllable feed, yet protects the thermoplastic material from oxidative degradation. One embodiment of the invention comprises a portable cement gun.

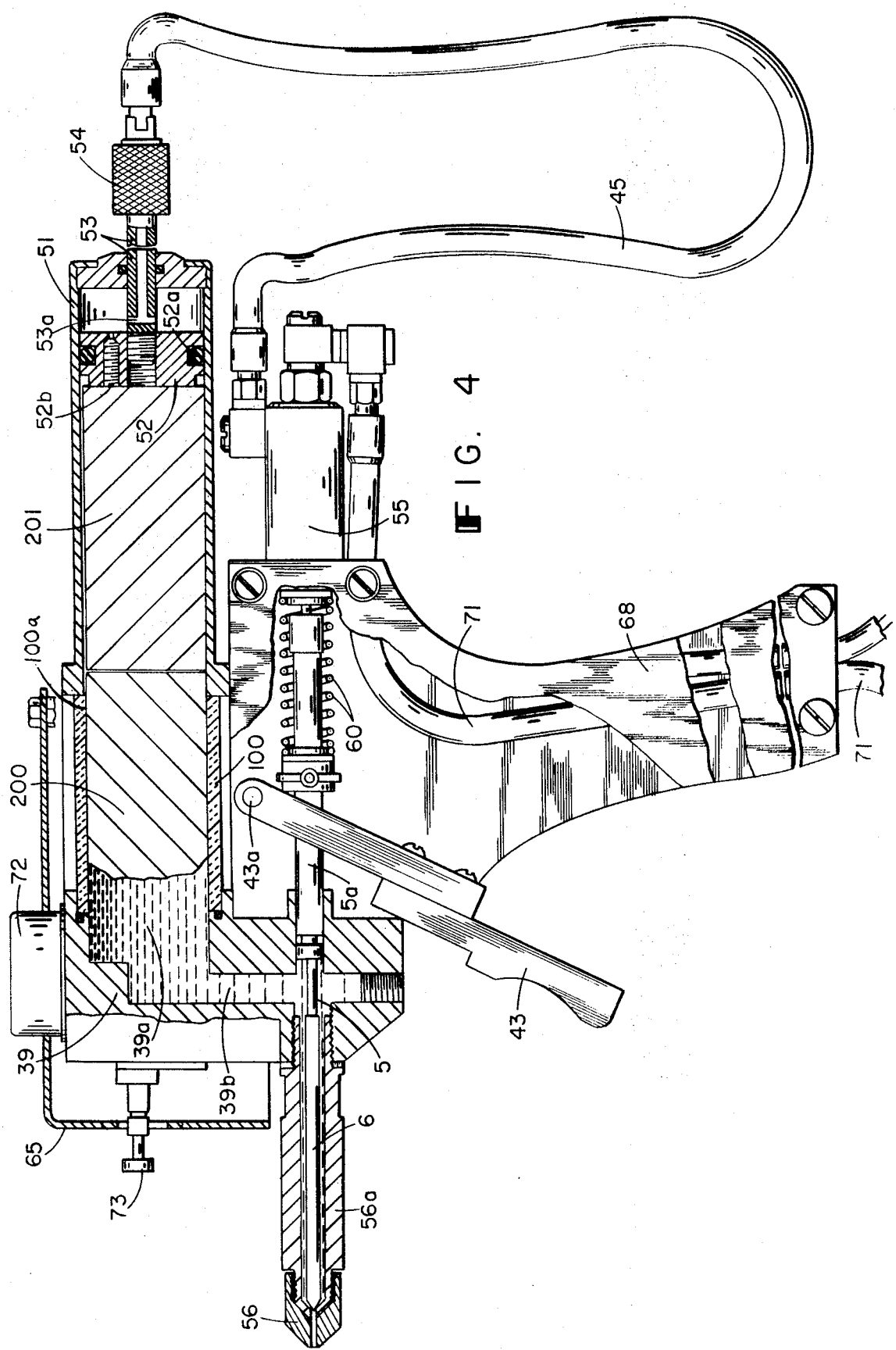

APPARATUS FOR DISPENSING THERMOPLASTIC MATERIAL

This is a continuation-in-part of our copending application Ser. No. 712,224, filed Mar. 11, 1968, now abandoned.

BACKGROUND OF INVENTION

Thermoplastic cements are used in many manufacturing procedures, as for examples, the assembly of various components of a shoe or in packaging. However, devices which have been previously described for dispensing such materials suffer from one or more disadvantages resulting from clogging and oxidation of the cement. This problem is particularly accentuated in the case of polyester and polyamide thermoplastic cements which are typically supplied as cylindrical blocks and melt at a temperature in the range of approximately 250° F.—600°B F.

SUMMARY OF INVENTION

The invention in its broad sense comprises providing a well heated only in its inner section and adapted to receive a fitted block of normally solid thermoplastic material such as cement. An orifice is provided in the inner section of the well which opens into conduit means leading to an exit port. An externally controllable shutoff valve means is provided in the conduit. Power means, as for example, fluid pressure means, are supplied for continuously applying pressure to the exposed portion of the block of thermoplastic cement.

The apparatus is so arranged that sufficient heat is applied only in the inner section of the well and the exit conduit to melt the adjacent portion of the thermoplastic block and keep it molten. However, the heat is so regulated, as for example, by making the walls of the outer section out of non-heat-conductive material, that the portion of the thermoplastic block adjacent the outer section of the well is kept in a solid state.

In one form of this invention, the thermoplastic block does not extend beyond the open end of the well. The fitted ram of a power cylinder slides within the well and is movable against the end of the block.

In a second form of this invention, the block of thermoplastic material can extend beyond the open end of the well. In this case the power ram does not move into the well but acts on the block of thermoplastic material which extends into the cylinder. Instead of a single block, a pair or more of abutting blocks can be used, which make it easier to load, as in the case of a cement gun.

In a third form of this invention the block or series of abutting blocks extend beyond the open end of the well and are pressed downward by pressure means engaging the side of an exposed portion of the block or blocks.

We have found that by use of this invention we are able to provide a desired rate of uniform, variable or intermittent cement feed over extremely long periods of time without any clogging and without any charring. We have also found that thermoplastic cement can be stored in the apparatus of our invention in either heated condition or unheated condition for very long periods of time without deterioration, charring or clogging.

BRIEF DESCRIPTION OF DRAWINGS

FIG. 4 is a cross section along lines 4-4 of FIG. 3.

SPECIFIC EXAMPLE OF INVENTION

Figure 1:
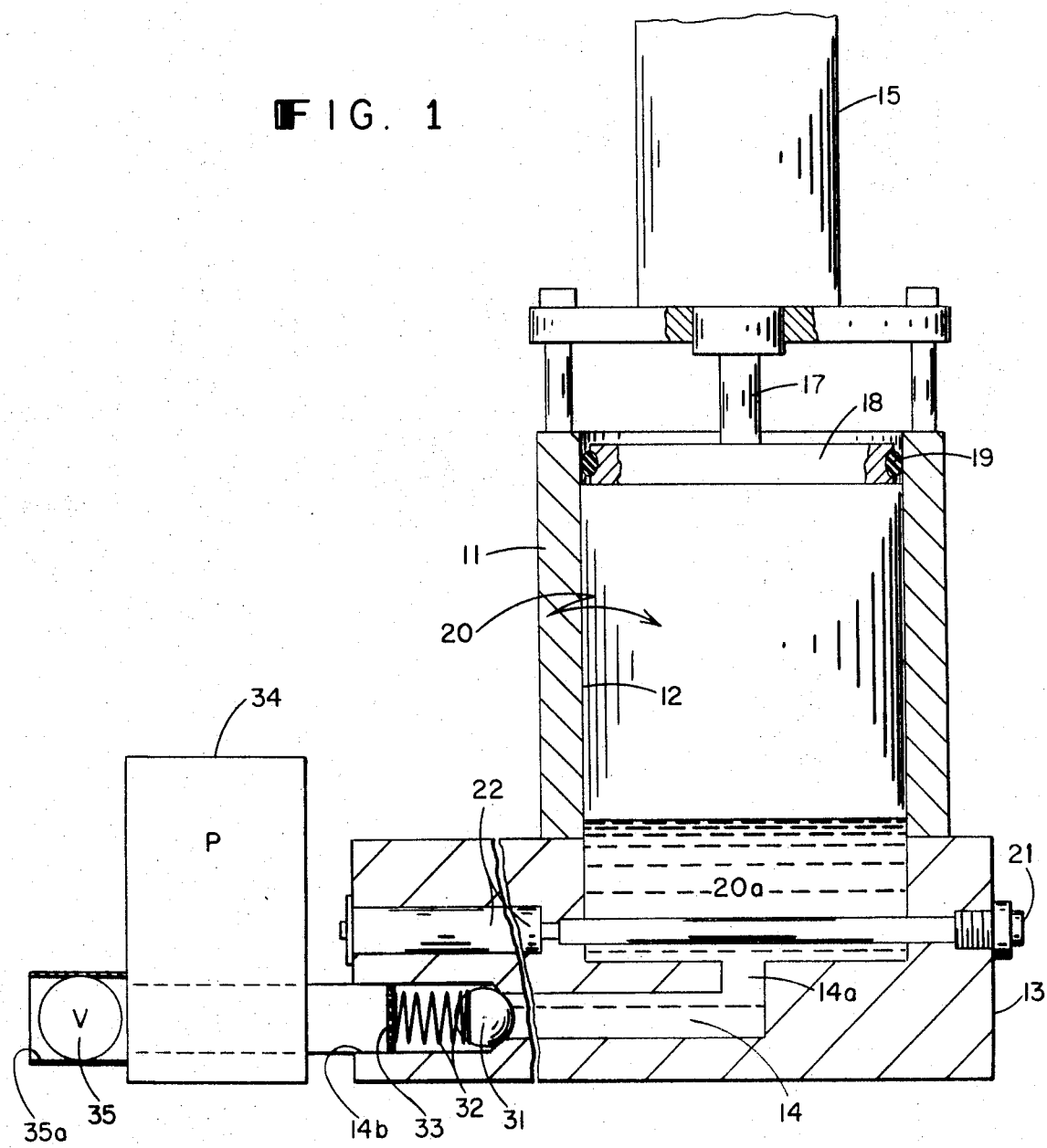
FIG. 1 is a transverse vertical section of one form of the invention wherein a power ram moves against the end of a thermoplastic member wholly within the well.

In the embodiment illustrated in FIG. 1, open end well 12 is formed by an inner heating metal block 13 having a cavity and outer, hollow, non-heat-conductive cylinder 11. Block 13 has a bottom well orifice 14a leading to an outlet channel 14 terminating at an exit port 14b. The exit port 14b contains a valve comprising a ball 31, a light stainless steel spring 32 and a spring-retaining strip 33. The valve is normally open unless pressure is applied by a metering pump 34 which has a delivery valve 35 and port 35a. A transverse electrical heating element 21 is provided which extends adjacent the bottom of the well 12. A further electrical heating element 22 is provided which extends through the block 13 so as to provide sufficient heating means for the orifice of the well and the outlet channel.

On the top of the inner surface of the well 12 is a sealing ring 19 typically made of an inert resilient material such as Teflon which is required if granules are used instead of a block. Ram 18 of piston 17 operated pneumatically in an upper air cylinder 15 is fitted to slide in well 12 and be sealed by ring 19.

In this version, a fitted thermoplastic cement cylinder 20 is being continuously pushed downward by ram 18 so as to cause molten thermoplastic material 20a in the bottom of the well to be pushed out at port 14b when valve 30 is open. The entire charge of thermoplastic cement is shown contained within the well 12 but can extend outward as one or more abutting blocks.

The electrical heating elements 21 and 22 are connected to a source of power (not illustrated) through conventional means (not illustrated) for controlling the amount of heat dispersed. The amount of heat is so selected that the thermoplastic material in the bottom portion of the well is in a molten flowable condition. Flow control is achieved by the combination of continued ram pressure and control of pump 34. The device can thus be controlled so as to be either continuous or intermittent in its action. Since air cylinders and their controls and other power means for moving a ram are generally well understood, such details are not illustrated.

Figure 2:
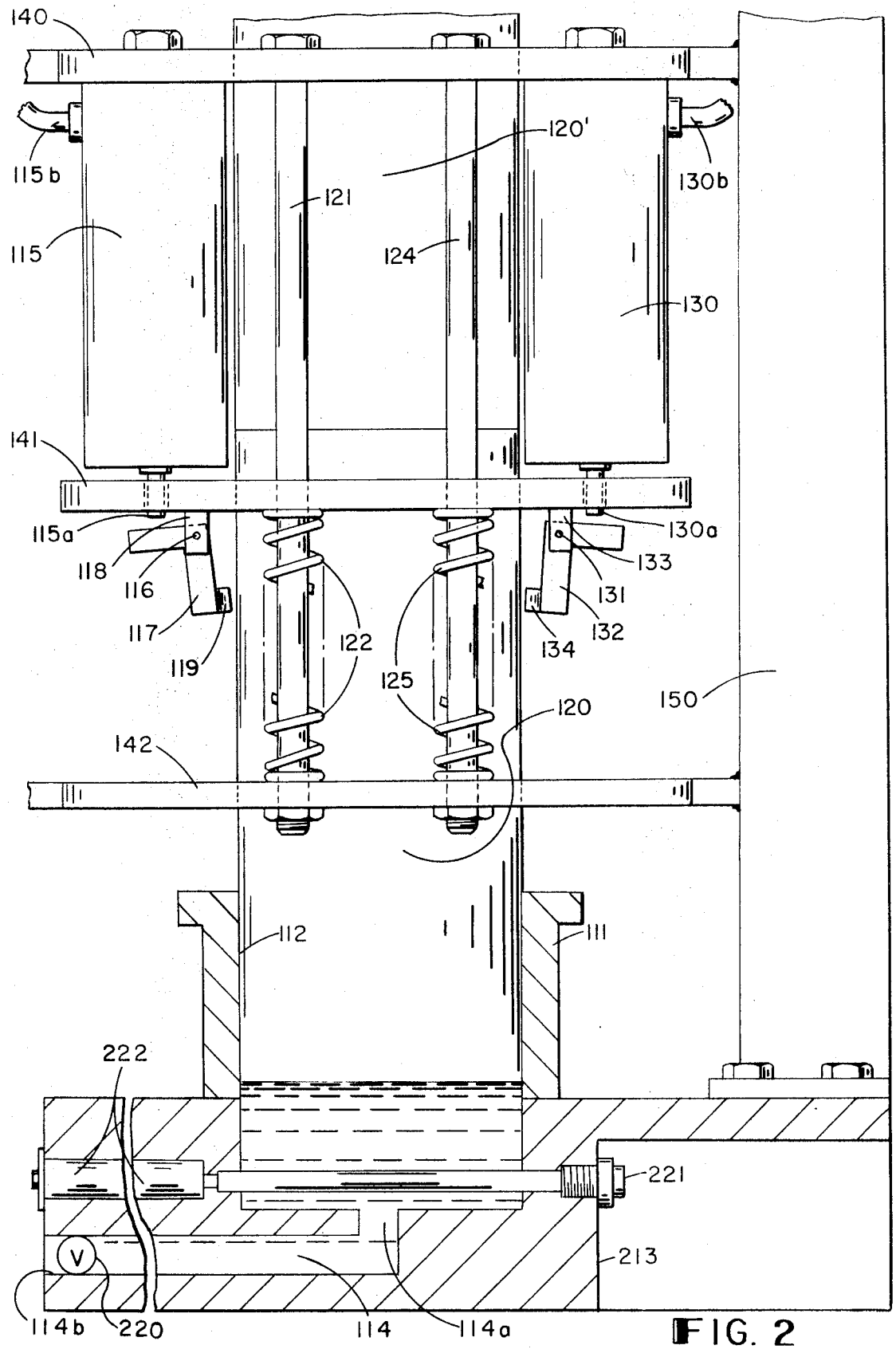
FIG. 2 is a transverse vertical section of another form of this invention wherein the thermoplastic member extends beyond the opening of the well and is engaged on its sides by a pair of downwardly pressing, power-actuated members.
Figure 2A:
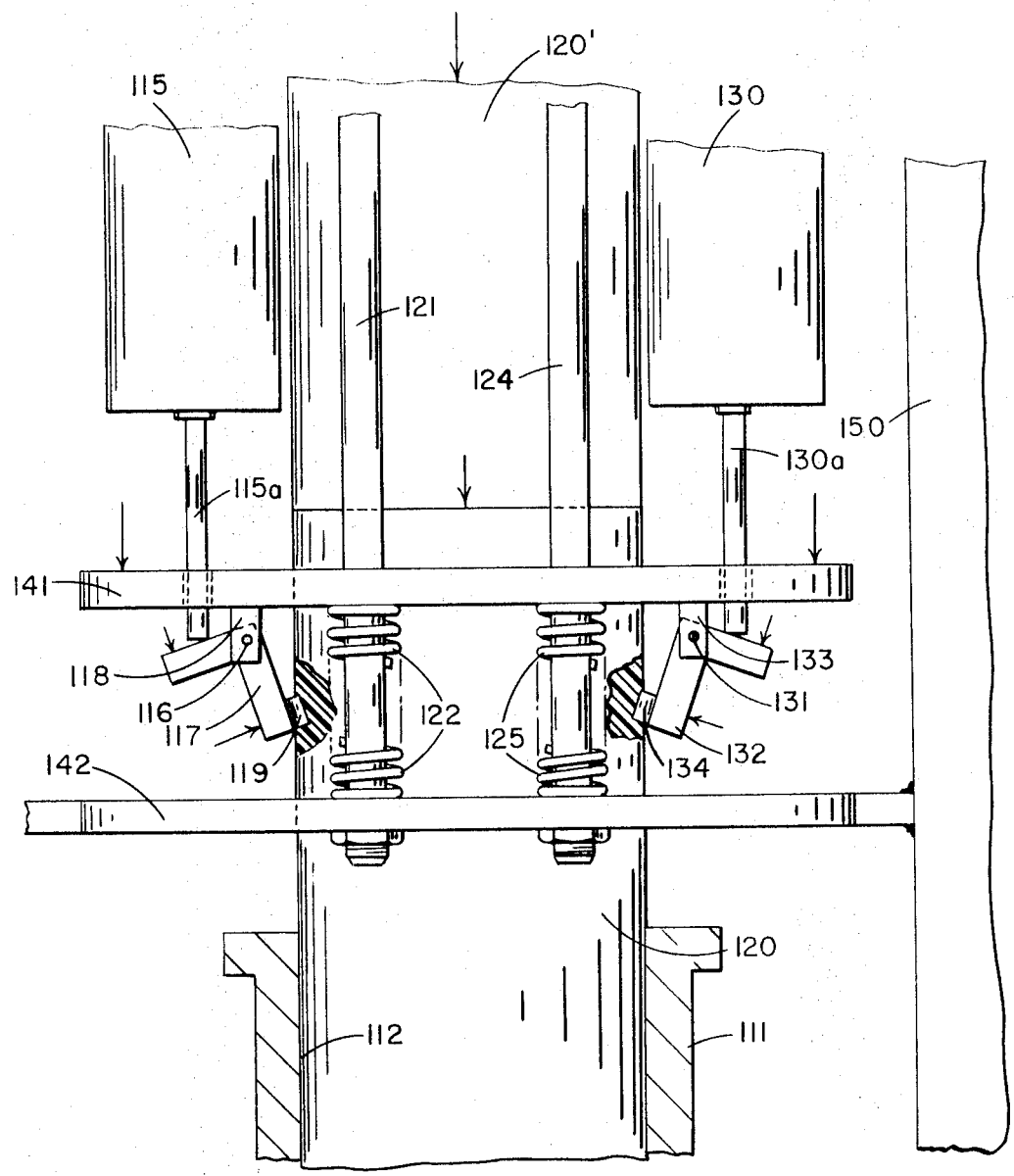
FIG. 2A is similar to FIG. 2 but with the pressure means engaging the thermoplastic member.

In the embodiment illustrated in FIGS. 2 and 2A, there is an open end well 112 comprising a similar non-heat-conducting cylinder 111 and a metal heating block 213 containing electrical heating elements 221 and 222, bottom orifice 114a, channel 114 and exit port 114b. An externally controllable shut off valve 220 is provided at the exit port 114b. The means for applying downward pressure are different in this embodiment than that illustrated in FIG. 1.

In FIGS. 2 and 2A abutting thermoplastic members 120 and 120' extend a considerable distance above the open end of the well. A support 150 holds a frame comprising an upper horizontal plate 140, a lower horizontal plate 142 and vertical rods 121 and 124 connected between the two plates. Anchored vertically to plate 140 are two air cylinders 115 and 130 spaced directly opposite one another on either side of the thermoplastic member 120 and supplied by air lines 115b and 130b. The piston rods of cylinders 115a and 130a extend through a horizontal plate 141 which is movable on rods 121 and 124 against springs 122 and 125.

Attached to movable plate 141 are depending arms 118 and 138 which, in turn, pivotally support Z-shaped members 117 and 132 on pins 116 and 131. Actuation of the piston rods 115a and 130 a cause them to engage with the Z-shaped members 117 and 132, so that the engaging portions thereof 119 and 134 bite into the thermoplastic member 120. Further downward motion of the piston rods 115a and 130a thus apply downward pressure on the thermoplastic block 120. When block 120 has been moved so that its end is near the well opening, retraction of the piston rods 115a and 130a frees the engaging members 117 and 132 from the block, thus permitting the compressed springs 122 and 123 to raise the movable plate 141 to its original position, thus positioning the Z-shaped members so as to now be engageable with a succeeding thermoplastic block 120' which had been stored on the first thermoplastic block 120.

The apparatus of these examples of the invention can be incorporated or attached to a machine which will utilize the thermoplastic cement, as, for example, a shoe-heel-attaching machine or a machine for applying thermoplastic cement in selected quantities to desired surfaces. While ram pressure and melt temperatures would depend on the material used and the feed required, we have generally observed that a continuous ram pressure in the range of about 20 to 80 pounds per square inch is useful with thermoplastic materials compounded from polyester or polyamide resins.

Figure 3:
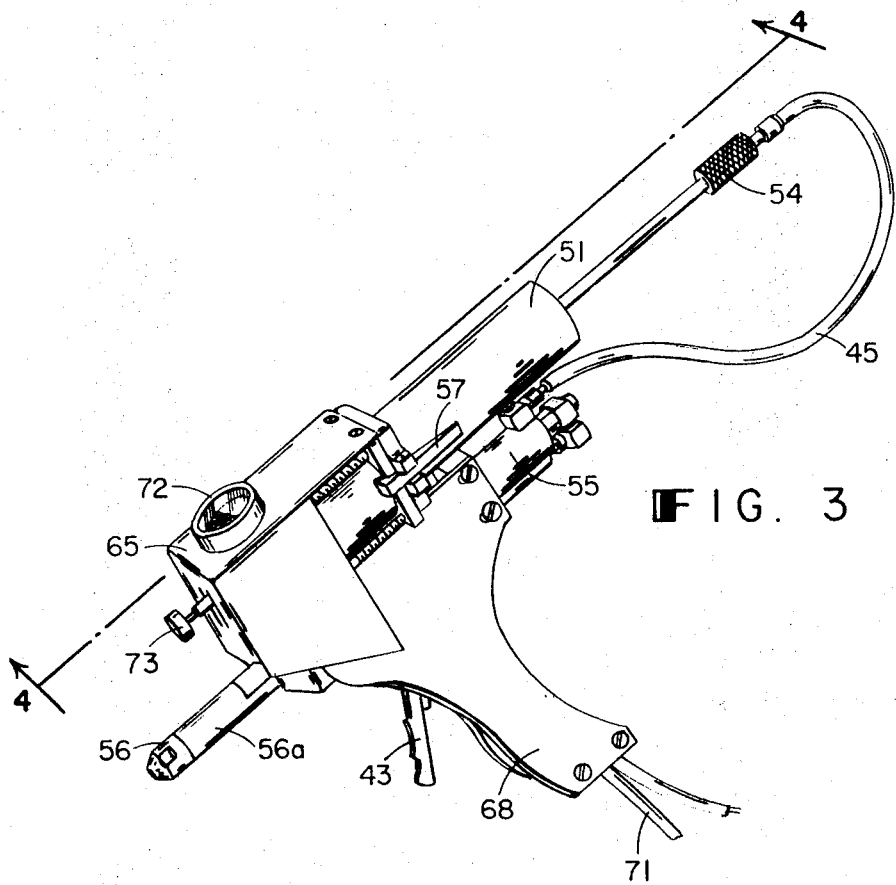
FIG. 3 is a perspective view of a cement gun made in accordance with this invention, in closed position.
Figure 5:
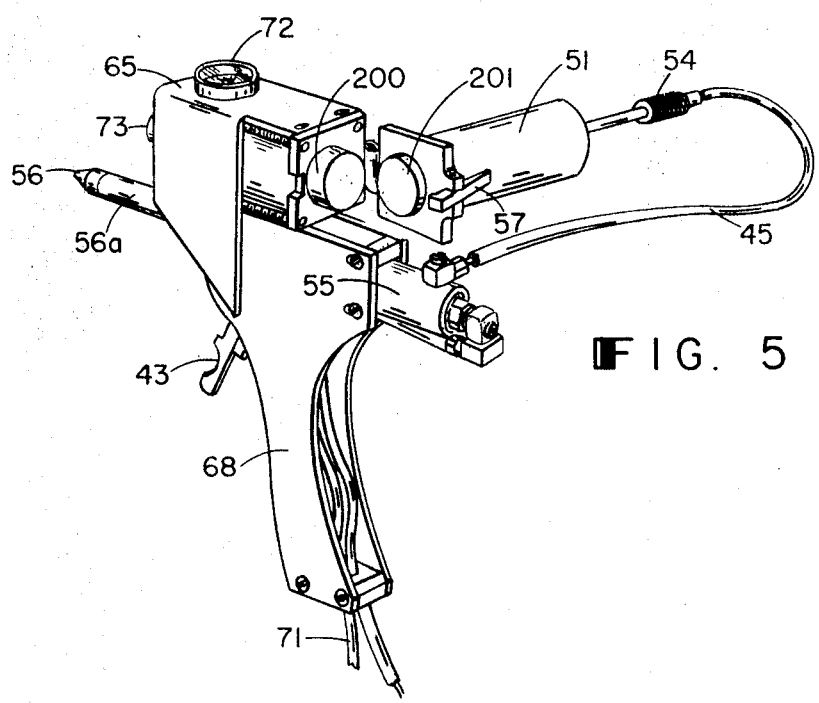
FIG. 5 is a perspective view of the cement gun in open, loading position.

In addition to fixed cement-dispensing installations, the invention can be used in the form of a cement gun. As shown in FIGS. 3—5, the illustrated air-pressure cement gun embodiment of this invention comprises a supporting or handle portion 68 on which is mounted a heating block 39 having a cylindrical hollow inner portion 39a and an abutting hollow cylindrical insulating portion 100 which has a hollow portion 100a. The hollow portions 39a and 100a register with one another to form the well which receives the fitted block of thermoplastic cement.

The outer end of the cylindrical insulating sleeve 100 opens into hollow cylinder 51, which is provided with piston 52 threaded onto piston rod 53. Piston rod 53 also contains the air supply conduit for the cylinder connected through slide valve 54 to air hose 45. The cylinder piston assembly 51—52 is arranged to be pivotable on the end block of the well and is held in alignment with the well by latch 57.

Heating block 39 has an outlet portion 39b opening into a conduit 56a in tubular nozzle 56. Spaced within the conduit 56a is a needle valve 6 actuable by a portion 5a connected to a spacer 115 and return spring 60. Actuation of the trigger 43 operates the valve 5.

Operation of the trigger 43 also serves by means of spring mount 56a to vary the pressure in air valve 55. Air from air supply 71 enters valve 55 which is preset for constant minimum pressure and thence exits through hose 45 through slide valve 54 to cylinder 51. Accordingly, when the trigger is pulled back, it not only opens the orifice of the needle valve 56 but also allows more air pressure to go from air valve 55 into cylinder 51. In this manner, actuation of the trigger both adds more pressure to the back of the thermoplastic block, as well as opening needle valve 56. Thus, pulling back on the trigger 43 controls the rate of flow of molten thermoplastic material out of the orifice 25 of the nozzle 56.

The heating block 39b is provided with heating elements 62 and is typically made of aluminum or similar sturdy metal. Insulating sleeve 100 which is tightly joined to the heating block 39 with O-ring 63 is typically made of a formable material such as impregnated fiberglass or transite. The piston 52 has an O-ring 52a for sealing with the cylinder 51. Piston 52 also has an orifice which accommodates an adjustable screw 52b which provides an air leak from the back of the piston to the end of the thermoplastic block. Such cooling is normally not required, but may be desirable where the gun is very small or the surrounding environment so hot that its air, which normally keeps sleeve 100 cool, is insufficiently cool to keep the end of the thermoplastic block in solid condition.

A thermometer 72 and thermostat 73 are provided to assist the operator in controlling desired molten cement temperature. Frame 65 serves as a heat shield.

In operation, the latch 57 is released, and the hinged upper piston cylinder assembly 51—52 is moved away, thus exposing the interior 39a—100a of the well and the interior of the cylinder 51. A block of thermoplastic cement 200 is inserted into the well and another block 201 into the cylinder. At this particular moment, the slide valve 54 is off so that there is no pressure on piston 52. As soon as the blocks are loaded, the cylinder is locked onto the well frame by means of the latch 57 and slide valve 54 is actuated, thus applying the predetermined constant pressure to the back of thermoplastic member 201 which moves against thermoplastic member 200. Inasmuch as only the lower portion of the well, 39a, is being heated and since the upper portion of the well 100a has non-heat-conductive walls and is exposed to the air on its sides, the only molten portion of the thermoplastic member will be that within the heating block and slightly above as indicated in FIG. 4. Such portion is kept constantly molten and is under continuous pressure.

We claim:

1. An apparatus for dispensing thermoplastic material comprising:
   a. a well adapted to receive a fitted member of cross section substantially identical to the cross section of the interior of the well and made of normally solid thermoplastic material, said well being defined by registering cavities in abutting outer and inner sections, said outer section having an opening through which said thermoplastic member is loaded into said well; said inner section having a discharge orifice;
   b. means for heating said inner section to provide therein a constant reservoir of molten thermoplastic material within said inner cavity, the walls of said outer section being sufficiently cooler than the walls of said inner section so that any molten material solidifies before reaching said opening and the portion of said thermoplastic member near or exterior to the loading opening remains solid at all times;
   c. conduit means in said inner well section leading from said orifice to an exit port;
   d. externally controllable valve means in said conduit;
   e. power means for applying pressure against the outer end of such a thermoplastic member in said well whether or not said valve means is closed or open;

said apparatus being characterized in that said constant reservoir of molten thermoplastic material is sealed by said solid thermoplastic material, and is under pressure so that opening of said valve means permits instantaneous outward flow of said molten thermoplastic material.

2. The apparatus of claim 1 wherein the walls of said outer well section are substantially less heat conductive than the walls of said inner well section.

3. The apparatus of claim 1 wherein said outer well section is made of heat-insulating material and said inner well section is a metal block having electrical heating means inserted therein.

4. The apparatus of claim 1 wherein said power means comprises fluid pressure means, said valve is actuable by a trigger and the movement of said trigger varies the amount of fluid pressure applied to the end of said thermoplastic member.

5. The apparatus of claim 4 wherein said power means comprises air pressure means, said valve is actuable by a trigger and the movement of said trigger varies the amount of air pressure applied to the end of said thermoplastic member.

6. The apparatus of claim 4 wherein said outer well section is an insulating sleeve, said inner well section is a metal block with electrical heating means inserted therein, said power means comprises air pressure means, said valve is actuable by a trigger and movement of said trigger varies the amount of fluid pressure applied to such a thermoplastic member inserted in said well.

7. The apparatus of claim 5 wherein said air pressure means includes an air pressure cylinder assembly pivotably mounted over the loading opening of said well so that it can be moved aside for insertion of a thermoplastic member, means being provided to hold said assembly in alignment with said well in closed position.

8. The apparatus of claim 1 wherein said power means includes a substantially fitted ram movable against the end of said thermoplastic member within the well.

9. The apparatus of claim 1 wherein said well is adapted to receive a single thermoplastic member or abutting members extending beyond the open end of the well.

10. The apparatus of claim 9 wherein said power means includes a pressure means engageable outside the well with the exposed portion of the thermoplastic member.

11. The apparatus of claim 7 wherein one thermoplastic member is inserted into the well and a second thermoplastic member into the cylinder assembly.